Aug. 3, 1948.       R. C. BURT       2,446,258
COMPASS
Filed Nov. 29, 1943       2 Sheets-Sheet 1
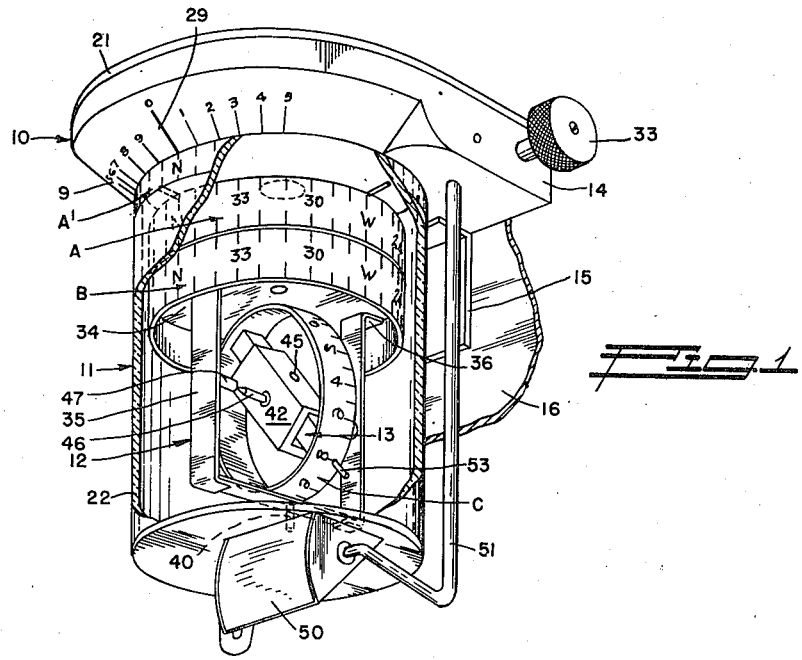
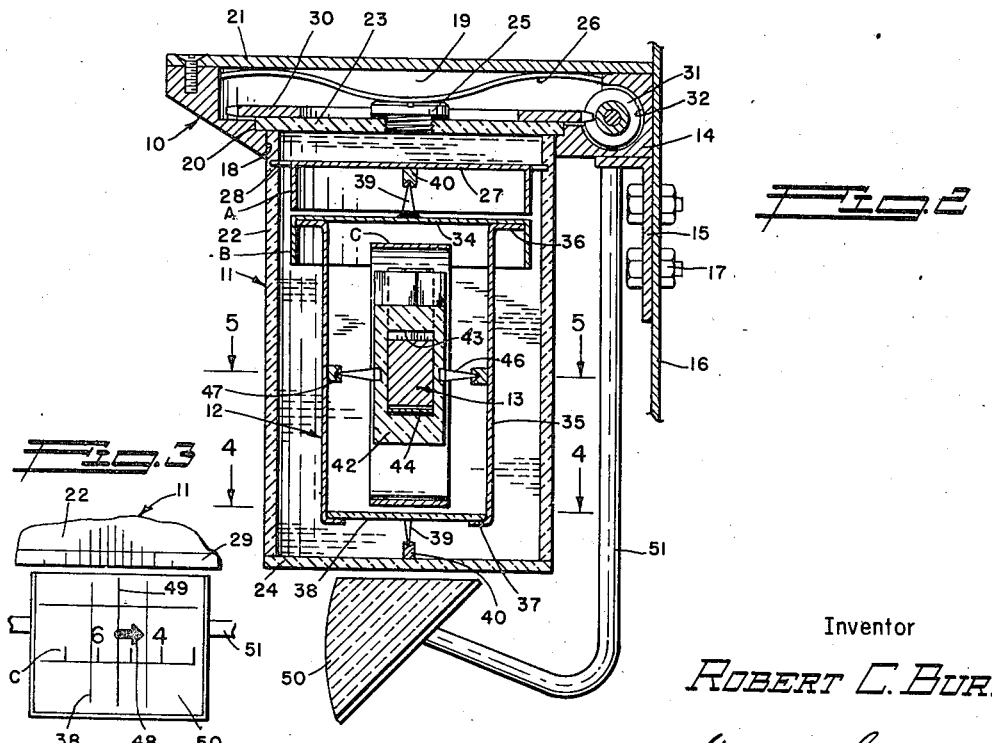
Inventor
ROBERT C. BURT
By George C. Sullivan
Agent Aug. 3, 1948.     R. C. BURT     2,446,258
COMPASS
Filed Nov. 29, 1943     2 Sheets-Sheet 2
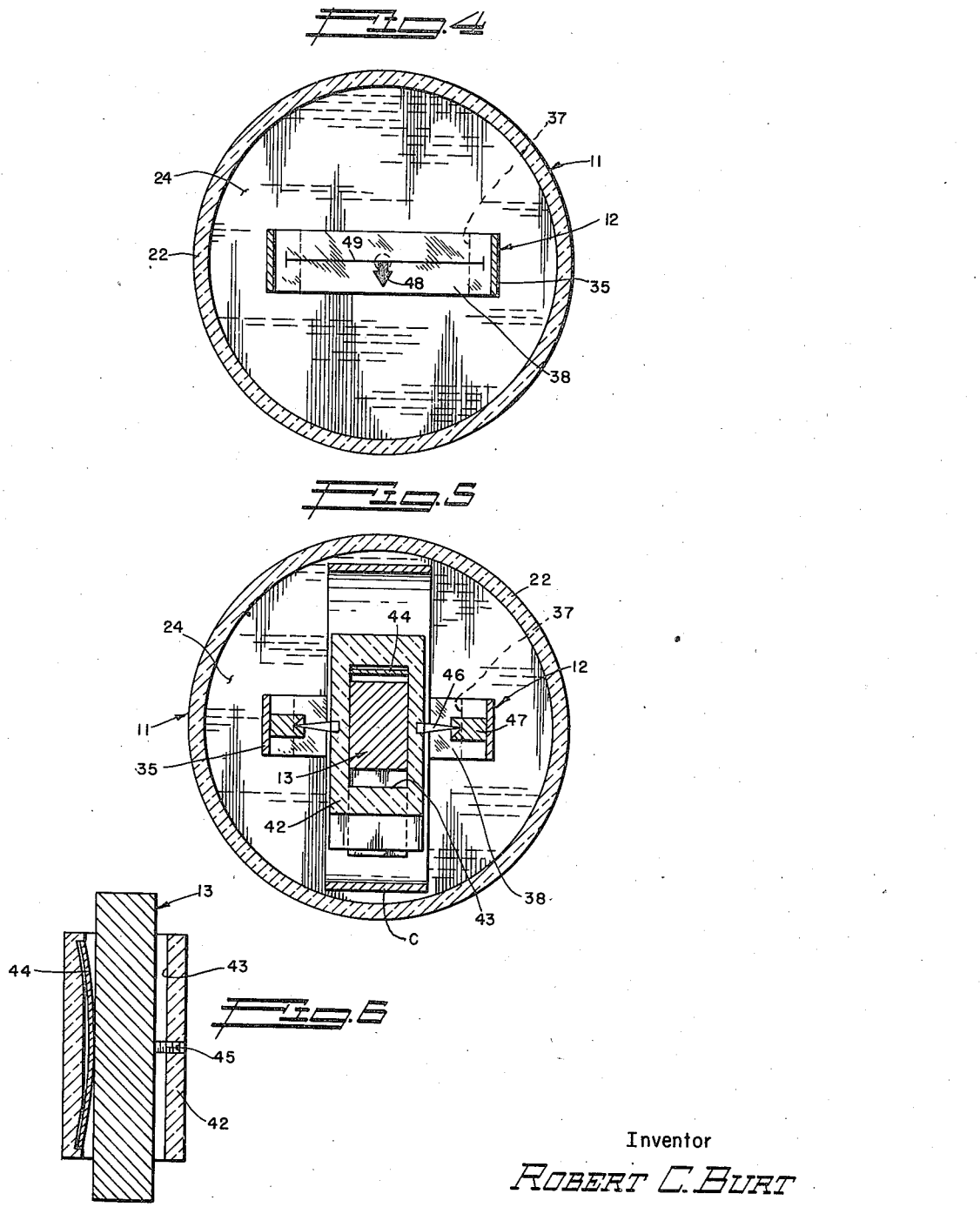
Inventor
ROBERT C. BURT
By George A. Sullivan
Agent Patented Aug. 3, 1948

2,446,258

UNITED STATES PATENT OFFICE 2,446,258

COMPASS

Robert C. Burt, Pasadena, Calif., assignor to Lockheed Aircraft Corporation, Burbank, Calif.

Application November 29, 1943, Serial No. 512,215

4 Claims. (Cl. 33—222)

This invention relates to compasses, and has particular reference to navigational compasses useful on aircraft.

When a conventional magnetic compass is used in an airplane it is subject to the fault or error known as "northerly turning error." A conventional compass operates on the horizontal component of the earth's magnetic field and when the airplane banks during a turn, the plane of the compass card is tilted with respect to the horizontal. This tilting of the card causes the needle to be acted upon by the vertical component of the earth's magnetic field with undesirable and confusing results. Assuming the airplane to be in the northern hemisphere and following a northerly course when it makes a banked turn, the needle of the conventional compass swings downwardly at a rate determined by the characteristics of the compass, the earth's magnetic field and the degree of the bank. The needle may turn faster than the airplane, it may turn at the same rate as the airplane, or it may turn slower than the airplane, depending upon the particular heading of the airplane, the angle of bank, period of the compass and direction of the turn, and thus indicate a turn in the wrong direction, indicate no turn, or a slower turn in the correct direction. This "northerly turning error" renders the typical magnetic compass unreliable and many pilots have gone into a spin and crashed on this account.

It is an important object of the present invention to provide a navigational magnetic compass suitable for use on aircraft, and other vehicles, that is not subject to "northerly turning error" during normal or ordinary maneuvering and therefore provides a true reading under practically all conditions of turning and banking of the craft.

Another object of this invention is to provide a compass of the character referred to in which the magnetic needle assumes and maintains a position parallel with the earth's magnetic flux, entirely independently of the horizon, and preserves this attitude or position throughout all ordinary or routine maneuvering of the airplane. The ability of the needle to remain in parallelism with the earth's magnetic flux substantially obviates the "northerly turning error" inherent in conventional compasses.

Another object of this invention is to provide a compass of the character mentioned in which the needle may be very accurately dynamically balanced so that it has no tendency to turn due to acceleration effects.

Another and important object of the invention is to provide a compass of the character referred to that operates to indicate the angle of magnetic dip from which the latitude may be approximately determined. A scale is carried by the needle of the improved compass to turn therewith about a horizontal axis and this scale is read with a reference mark on a supporting element to indicate the magnetic dip.

Another and important object of the invention is to provide an overhead course setting compass that may be very accurately set. The compass of the invention embodies a vernier scale on a relatively stationary object, such as a mounting member, and the course setting scale is provided on the manually turnable element to cooperate with the vernier scale so that the compass may be very easily set with great accuracy.

Another object of the invention is to provide a compass of the character referred to in which the magnetic azimuth scale and the course setting scale are both continuous throughout a full 360° and bear identical calibrations and indicia to be read together from any position around the compass.

Another object of the invention is to provide an overhead compass of the class referred to embodying a simple, yet effective, optical means for facilitating the viewing of the needle or compass card along a generally horizontal optical axis.

A further object of this invention is to provide a compass of the character referred to that may be embodied in an extremely small instrument unit to be rapid in its action.

Other objects and features of the invention will be made apparent by the following detailed description of a typical illustrative embodiment throughout which description reference is made to the accompanying drawings in which, Figure 1 is a perspective view of the compass of the invention, with the envelope broken away to show the internal parts in elevation;

Figure 2 is a central vertical detailed sectional view of the compass;

Figure 3 is a fragmentary detailed view of the prism and the image that appears therein;

Figures 4 and 5 are enlarged transverse detailed sectional views taken as indicated by lines 4—4 and 5—5 respectively, on Figure 2;

Figure 6 is an enlarged longitudinal detailed sectional view of the needle and its mounting.

The compass of the invention may be varied to adapt it for different applications and installations. In the drawings I have illustrated a typical embodiment suitable for use in aircraft, it being understood that the invention is not to be considered as limited either in its scope or application to the particular details herein disclosed.

The form of the invention illustrated in Figures 1 to 6 inclusive may be said to comprise generally a mounting 10, a rotatable case 11 carried by the mounting 10 and having a course setting scale A, a frame 12 supported in the case 10 for rotation about a vertical axis and having a magnetic azimuth scale B and a compass needle 13 supported in the frame 12 for rotation about a horizontal axis and having a scale C for indicating the magnetic dip.

The mounting 10 may be such that it adapts the compass for attachment to any required or selected support. In the construction illustrated, the mounting 10 is such that the compass may be attached to a ceiling or vertical wall of a cabin or cockpit. The mounting shown includes a main member 14 provided with a mounting bracket 15. The bracket 15 is secured to a vertical support 16 by screws or bolts 17. The member 14 extends horizontally from the bracket 15 and has a central vertical opening 18. The opening 18 is counterbored or enlarged from its upper end to have a socket 19 and an upwardly facing annular shoulder 20. The mouth of the socket 19 is closed by a removable plate 21.

The envelope or case 11 serves to house the principal compass elements and carries the course setting scale A. In the construction illustrated, the case 11 is a hollow cylindrical structure comprising a cylindrical side wall 22, a top closure 23, and a bottom closure 24. The case 11 is formed of glass, transparent plastic, or other suitable transparent material. The top and bottom closures 23 and 24 are sealed with and secured to the ends of the side wall 22 by cement, or the like. The case 11 is suspended from the mounting 10 to be almost entirely exposed to view. The side wall 22 is rotatably received in the opening 18 of the member 14 and the top closure 23 projects beyond the side wall to bear on the shoulder 20 and thus suspend the case. The case 11 contains a body of colorless or transparent liquid to dampen movement of the compass elements. A filling opening is provided in the top closure 23 to facilitate filling of the case and the opening is normally closed by a screw threaded plug 25. The plate 21 is removable to give free access to the plug 25 and the filling opening. Means is provided to hold the projecting top closure 23 seated on the shoulder 20. This means may comprise a bowed leaf spring 26 bearing between the plate 21 and the top of the plug 25. The spring 26 serves to resist or prevent upward movement of the case 22 with respect to the mounting means 10.

The course setting scale A may be in the nature of an annular flange depending from a disc 27. Any suitable means may be employed to secure the scale A in the case 11. In the simple structure illustrated, pins 28 project from the scale and are secured in sockets in the side wall 22 to fix the scale in the case. The exterior of the scale A is suitably calibrated in degrees and bears the usual compass characters N, E, S, and W. The scale A cooperates with a vernier scale 9 and reference line 29 on the mounting member 14. The compass is positioned so that the line 29 lies in the central longitudinal axis of the airplane. The vernier scale 9 and reference line 29 are provided on a sloping forward face of member 14, the scale 9 extending from each side of the line. The scale A has a counterpart scale $A^1$ formed on the external surface of the case directly below the scale 9 and line 29. The scales A and $A^1$ are identical in their calibrations and both extend 360° around the case. The scale $A^1$ is a continuation of the scale A to aid in reading the scale A with the reference line 29 and vernier scale 9. In setting the course, the case 11 is turned to bring the selected course calibration of the scales A and $A^1$ into registration with the line 29. The vernier scale 9 facilitates the accurate setting of the scales A and $A^1$ and the case 11.

The invention includes means for readily adjusting or rotating the case 11 to set the scale A. In the embodiment of the invention illustrated, this means includes a worm wheel 30 fixed to the top closure 23 to be within the socket 19. A worm 31 is rotatable within a horizontal tangential opening 32 in the member 14 and meshes with the wheel 30. The shaft of the worm 31 projects from the member 14 and has a knurled knob or hand wheel 33 to facilitate rotation of the worm. It will be apparent how the hand wheel 33 may be manipulated to rotate the case 11 for the purpose of setting the scale A.

The frame 12 is mounted within the case 11 and serves to support the needle 13 and the scale B. The frame 12 comprises an upper disc 34 having a downturned annular flange which constitutes the scale B. The disc 34 and the scale B may be substantially identical with the disc 27 and scale A. The disc 34 is arranged immediately below the lower edge of the scale A so that the scale B is directly below the scale A. The scale B is provided with calibrations identical with the calibrations on the scale A and continuing throughout the full 360°. The frame 12 further includes two spaced vertical members 35 having ears or flanges 36 on their upper ends secured to the under side of the disc 34. The members 35 are diametrically opposite and are provided at their lower ends with inturned ears 37. A transverse or horizontal member 38 extends between and is secured to the ears 37. It may be preferred to have the horizontal member 38 bear on the upper sides of the inturned ears. The member 38 is formed of transparent material so that it does not interfere with the view of the dip scale C as will later become apparent. The frame 12 is supported for rotation about a vertical axis which is preferably coincident with the axis of rotation of the case 11. Any suitable form of gimbals or bearings may be employed to mount the frame 12 in the case 11. I have shown vertically disposed pointed pins 39 on the disc 34 and horizontal member 38 cooperating with socketed jewels or blocks 40 on the disc 27 and bottom closure 24. These bearings support the frame 12 for rotation with a minimum of friction.

The needle 13 is supported in the frame 12 for free rotation about a horizontal axis, that is about an axis normal to the axis of rotation of the frame. The needle 13 may take various forms but I prefer to employ a magnetic needle in the form of an elongate block of rectangular or square cross section. The needle 13 is arranged in or extends through a sleeve 42. The sleeve 42 may be square or rectangular in transverse cross section and its opening 43 is proportioned to receive the needle 13 for adjustment. As best illustrated in Figures 5 and 6 of the drawings, the opening 43 is transversely elongated in one direction to permit bodily movement of the needle 13 with respect to the sleeve in a transverse direction as well as a longitudinal direction. The needle 13 may be adjusted both longitudinally and laterally with respect to the sleeve 12 and the invention provides means for setting or securing the needle in its adjusted position. The means includes a bowed leaf spring 44 partially recessed in the wall of the opening 43 and bearing against a surface of the needle. A set screw 45 is threaded through an opening in the wall of the sleeve 42 to clamp against the opposite surface of the needle. It will be seen from an inspection of Figures 5 and 6 how the needle 13 may be readily adjusted with respect to the sleeve 42 and then set or secured in the adjusted position by means of the screw 45.

The ability to adjust the needle 13 is important because it allows the needle to be dynamically balanced and therefore resistant to or unaffected by acceleration effects. If desired, the needle supporting sleeve 42 may be formed of a transparent material. The means for supporting the needle 13 for rotation about a horizontal axis may comprise pointed bearing pins 46 projecting from opposite sides of the sleeve 42 and engaging in recessed blocks 47 fixed to the inner sides of the frame members 35. The common axis of the bearing pins 43 is normal to the common axis of the bearing pins 39 and is midway between the ends of the sleeve 42.

The magnetic dip scale C is secured to the needle 13 to move therewith. As illustrated, the scale C may be in the form of a ring or annular drum directly secured at diametrically opposite points to the ends of the needle 13. The external surface of the scale C is suitably calibrated in degrees which may be read with a reference point or line on the frame 12. As best illustrated in Figure 4 of the drawings, I have provided a central horizontal line 49 on the upper surface of the frame member 38 with an arrow 48 extending laterally from the line 49. The dip scale C is arranged and proportioned to rotate within the frame 12 without interference, but its lower portion moves in close proximity to the frame member 38 so that its calibrations are close to the line 49. It is desirable to prevent the needle 13 and dip scale from rotating past the vertical in the event of violent maneuvering of the craft. For this purpose I may provide a stop pin 53 projecting from the dip scale C and adapted to strike the member 38.

The invention includes means whereby the pilot may readily view the dip scale C and the reference line 49 along a horizontal axis to determine the magnetic dip. The information thus gained is useful in rough navigation and discloses whether the airplane is in level flight. A magnifying prism 50 is arranged below the case 11. Spaced arms 51 project downwardly from the mounting member 14 and adjustably support the prism 50 so that it may be moved to the correct angle. The prism 50 is positioned so that its magnifying convex surface is substantially normal to the longitudinal axis of the airplane. As diagrammatically illustrated in Figure 2, the reference line 49, the lower portion of the scale C, and the arrow 48 may be viewed along a horizontal axis from in front of the prism. The arrow 48 is useful in indicating the general magnetic azimuth.

From the above detailed description it will be seen that I have provided an overhead course setting compass that serves to give magnetic dip readings in addition to the course readings. The needle 13 being supported for rotation about a horizontal axis as well as a vertical axis may remain parallel with the earth's magnetic flux at all times. During turns the needle does not dip or turn by reason of the banking of the airplane, but remains in parallelism with the earth's magnetic flux. Accordingly, the compass is substantially free from the "northerly turning error" present in conventional compasses. Owing to the fact that the compass of the invention remains true and accurate throughout all turns during ordinary flight, it is unnecessary to employ a gyroscopic turn indicator and this latter instrument may be eliminated from the aircraft. When assembling the compass the needle 13 may be accurately balanced dynamically to remain unaffected by acceleration effects with the result that the compass is extremely steady and reliable. The magnetic dip indications provided by the compass are valuable in navigating the airplane. A particular feature and advantage of this invention resides in its adaptation to being mounted in an overhead position and supported from the roof or near the roof or ceiling of the airplane where the disturbing effects of stray magnetic fields from the electrical equipment therein and metallic parts thereof are usually at a minimum. In this connection it is to be observed that all of the scales of the compass are fully and easily read from below the level of the compass body.

From the above description it will be seen that I have provided a simple and very effective overhead compass particularly well suited for use in aircraft. The compass is easily set with great accuracy by simple manipulation of the knob 33. The vernier scale 9 cooperating with the scales A and A' assures extremely accurate setting of the compass even in embodiments where the compass is very small in size. The full circle scales A, B, and A' facilitate reading of the compass from any position and the reflector 50 makes it possible to determine at a glance the magnetic dip.

Having described only a typical form of the invention, I do not wish to be limited to the specific details herein set forth, but wish to reserve to myself any variations or modifications that may appear to those skilled in the art and fall within the scope of the following claims.

I claim:

1. A compass comprising overhead mounting means, a primary support carried by said means for rotation about a vertical axis and to depend from said means, a course setting scale on the primary support, a secondary support carried by the primary support for rotation about said vertical axis, a magnetic azimuth scale on the secondary support for cooperating with the course setting scale, a reference mark on the secondary support, a magnetic needle, means for mounting the needle on the secondary support for rotation about a horizontal axis to remain parallel with the earth's magnetic flux, the needle being operable to turn the secondary support, and a dip drum scale movable with the needle about said horizontal axis and cooperable with said mark to indicate the magnetic dip.

2. A navigational compass comprising a case, means suspending the case for rotation about a vertical axis, a course setting scale on the case, a frame supported in the case for rotation about said axis and having a magnetic azimuth scale for cooperating with the course setting scale, a magnetic needle mounted in the frame for rotation about a horizontal axis so as to remain parallel with the earth's magnetic flux, the needle being operable to turn the frame, a reference mark on the lower portion of the frame, and a drum type scale movable with the needle about said horizontal axis and cooperable with the reference mark to indicate the magnetic dip, at least the lower portion of the case being transparent so that the reference mark and the drum type scale are visible from the exterior of the case.

3. A navigational compass comprising a case, means suspending the case for rotation about a vertical axis, a course setting scale on the case, a frame supported in the case for rotation about said axis and having a magnetic azimuth scale for cooperating with the course setting scale, a magnetic needle mounted in the frame for rotation about a horizontal axis so as to remain parallel with the earth's magnetic flux, the needle being operable to turn the frame, a reference mark on the lower portion of the frame, a drum type scale movable with the needle about said horizontal axis and cooperable with the reference mark to indicate the magnetic dip, the case being constructed of transparent material so the azimuth scale, the reference mark and said drum type scale are visible from the exterior of the case, and a reflector supported below the case for reflecting the images of the reference mark and said drum type scale forwardly so that all of said scales and the reference mark may be viewed from a position in front of the case.

4. A navigational compass comprising a case, means suspending the case for rotation about a vertical axis, a course setting scale on the case, a frame supported in the case for rotation about said axis and having a magnetic azimuth scale for cooperating with the course setting scale, a sleeve mounted in the frame for rotation about a horizontal axis, a magnetic needle initially shiftable both axially and transversely in the sleeve, a spring in the sleeve bearing on one side of the needle to urge it transversely in one direction, and a screw on the sleeve for acting on the other side of the needle to urge it transversely in the other direction and to retain the needle in the axially adjusted position, the needle being operable to turn the frame about said vertical axis and being free to remain parallel with the earth's magnetic flux.

ROBERT C. BURT.

REFERENCES CITED

The following references are of record in the file of this patent:

UNITED STATES PATENTS

| Number | Name | Date |
| --- | --- | --- |
| 682,585 | Cotter et al. | Sept. 10, 1901 |
| 1,216,953 | Creagh | Feb. 20, 1917 |
| 1,533,683 | Abbot | Apr. 14, 1925 |
| 1,961,312 | Vion | June 5, 1934 |
| 2,087,086 | DeBeeson | July 13, 1937 |
| 2,116,103 | DeBeeson | May 3, 1938 |
| 2,118,082 | Hammond | May 24, 1938 |
| 2,215,622 | Sperry | Sept. 24, 1940 |

FOREIGN PATENTS

| Number | Country | Date |
| --- | --- | --- |
| 13,176 | Great Britain | 1850 |
| 407,946 | Great Britain | 1934 |